US006779833B2

(12) United States Patent
Benz et al.

(10) Patent No.: US 6,779,833 B2
(45) Date of Patent: Aug. 24, 2004

(54) RECREATIONAL VEHICLE FOLDABLE DECK

(76) Inventors: Dennis Claude Benz, Box 609, Caroline, Alberta (CA), T0M 0M0; Maurice Arthur Fortin, Box 923, Caroline, Alberta (CA), T0M 0M0; Yvan Aime Fortin, 134 Sunset Way, High River, Alberta (CA), T1V 1J4

( * ) Notice: Subject to any disclaimer, the term of this patent is extended or adjusted under 35 U.S.C. 154(b) by 0 days.

(21) Appl. No.: 10/666,376

(22) Filed: Sep. 19, 2003

(65) Prior Publication Data

US 2004/0056510 A1 Mar. 25, 2004

(30) Foreign Application Priority Data

Sep. 20, 2002 (CA) .............................................. 2404198

(51) Int. Cl.[7] .................................................. B60P 3/37
(52) U.S. Cl. ..................... 296/162; 296/26.15
(58) Field of Search .............................. 296/162, 26.12, 296/26.15, 26.01; 108/44; 52/79.5, 79.6

(56) References Cited

U.S. PATENT DOCUMENTS

| 2,368,936 A | 2/1945 | Mcgehee ...................... 296/23 |
| 3,620,564 A | 11/1971 | Wenger et al. ................ 296/26 |
| 4,883,306 A | 11/1989 | Stucky ........................ 296/162 |
| 5,417,468 A | 5/1995 | Baumgartner et al. ...... 296/162 |
| 5,899,518 A | 5/1999 | Schreiner ................. 296/26.01 |
| 6,467,417 B1 * | 10/2002 | Guyot et al. .................. 108/44 |

* cited by examiner

Primary Examiner—Joseph D. Pape
(74) Attorney, Agent, or Firm—Davis & Bujold, PLLC

(57) ABSTRACT

A recreational vehicle foldable deck includes supports adapted for attachment to a structural frame of a recreational vehicle. "L" shaped members are provided. A first end of each of the "L" shaped members is fixedly secured in spaced relation to the platform. A second end of the "L" shaped members is pivotally secured to one of the supports. This enables the platform to be pivotally movable from a substantially vertical stored position parallel to the one side of the recreational vehicle to a substantially horizontal operative position resting at a ground surface.

9 Claims, 5 Drawing Sheets

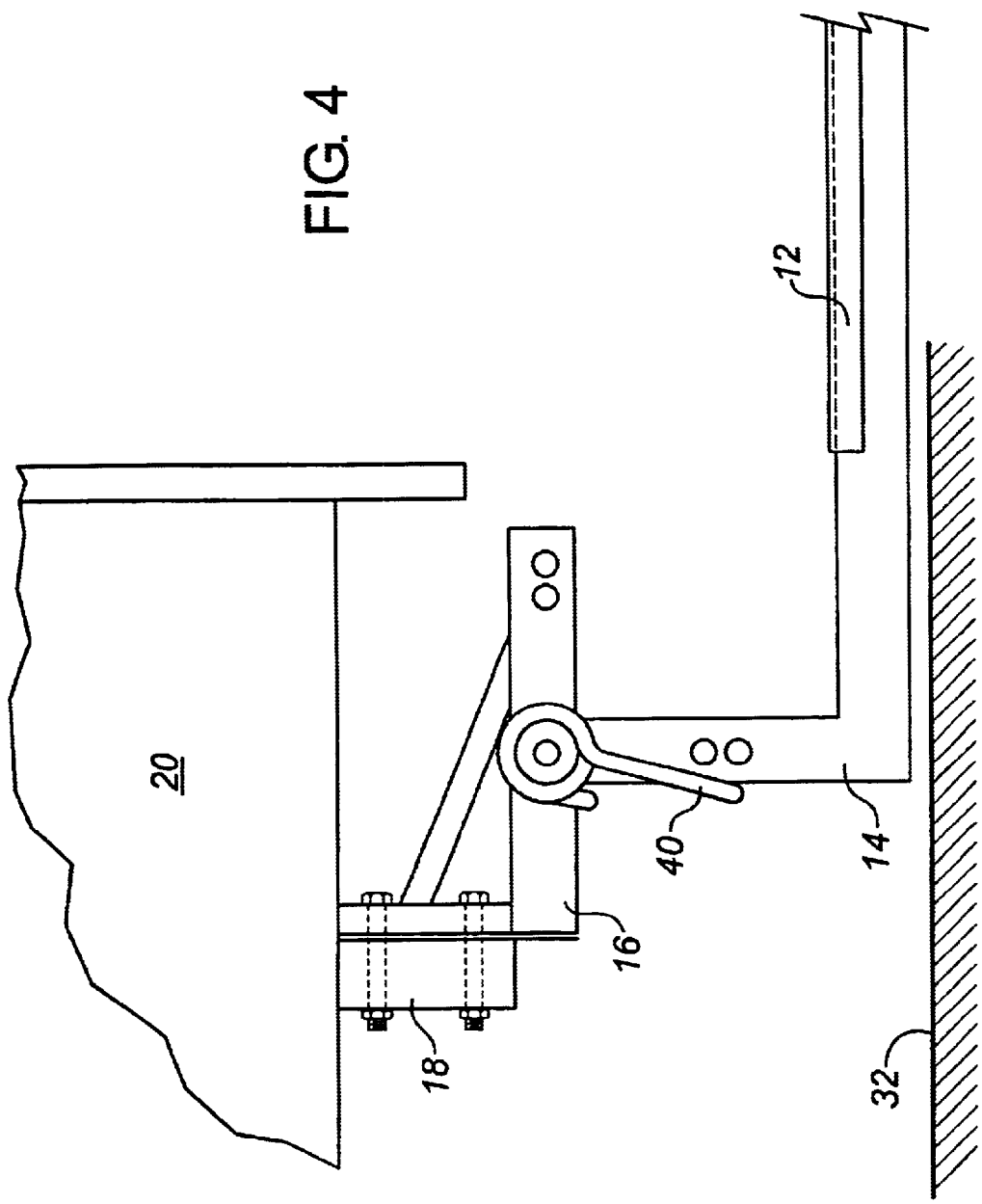

RECREATIONAL VEHICLE FOLDABLE DECK

FIELD OF THE INVENTION

The present invention relates to a deck that is secured to a recreational vehicle for movement between a substantially horizontal operative position and a substantially vertical stored position.

BACKGROUND OF THE INVENTION

U.S. Pat. No. 5,417,468 (Baumgartner et al) discloses a recreational vehicle foldable deck. The foldable deck of Baumgartner et al consists of a rectangular platform pivotally secured along a bottom edge of the recreational vehicle. The platform is pivotally movable between a substantially horizontal operative position and a substantially vertical stored position. When the platform is in the operative position, the platform is elevated on a plane which is approximately even with the height of the wheel axles. This distance, of roughly 12 inches from the ground, is accommodated by having support members pivotally attached along a remote edge of the platform. An elevated platform of this nature presents a potential hazard as, in the absence of a guard rail, persons may fall from the platform.

SUMMARY OF THE INVENTION

What is required is a recreational vehicle foldable deck in which the risk of persons falling from the platform is reduced.

According to the present invention there is provided a recreational vehicle foldable deck which includes at least two supports adapted for attachment to a structural frame along one side of a recreational vehicle. A platform is provided having a top and an underside and is adapted with at least two "L" shaped members. The "L" shaped members have a first end and a second end. The first end of each of the "L" shaped members is fixedly secured in spaced relation to the platform. The second end of each of the "L" shaped members is pivotally secured to one of the supports. This enables the platform to be pivotally movable from a substantially vertical stored position parallel to the one side of the recreational vehicle to a substantially horizontal operative position resting at a ground surface.

With the recreational vehicle foldable deck, as described above, the platform is always resting on or immediately above the ground surface.

Although beneficial results may be obtained through the use of the recreational vehicle foldable deck, as described above, the height of recreational vehicles varies. Even more beneficial results may, therefore, be obtained when either the supports or the "L" shaped members has several attachment points. By selection of attachment points, an adjustment may be made to maintain the platform close to the ground surface when in the operative position and close to the one side of the recreational vehicle when in the stored position.

Although beneficial results may be obtained through the use of the recreational vehicle foldable deck, as described above, it is preferred that the platform be in the form of a framework covered by a see-through mesh covering. This enables persons to see through windows on the recreational vehicle and air can pass through the platform to utility vents when the platform in the stored position.

Although beneficial results may be obtained through the use of the recreation vehicle foldable deck, as described above, it is preferred that the platform be segmented into two or more segments each of which is independently movable between the operative position and the stored position. This enables access to be obtained to a door on the recreational vehicle by lowering only one of the segments to the operative position. It is preferred that the size and weight of the segments be selected to enable the segments to be pivoted and manually lifted from the operative position to the stored position. It is also preferred that the segments have tension springs biasing the segments into the stored position. The biasing force of the springs serves to reduce the amount of force required to manually lift the segments from the operative position to the stored position.

Although beneficial results may be obtained through the use of the recreational vehicle foldable deck, as described above, it is preferred that some means be provided to secure the platform in the stored position. In the description that follows two such means will be described. A spring-loaded latch is described which serves to latch the platform in the stored position. In addition, a locking pin may be extended through the supports and the "L" shaped members to lock the platform in the stored position.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 4 is a side elevation view of the recreational vehicle foldable deck illustrated in FIG. 1, equipped with a biasing spring and positioned in an operative position.

DETAILED DESCRIPTION OF THE PREFERRED EMBODIMENT

Figure 1:
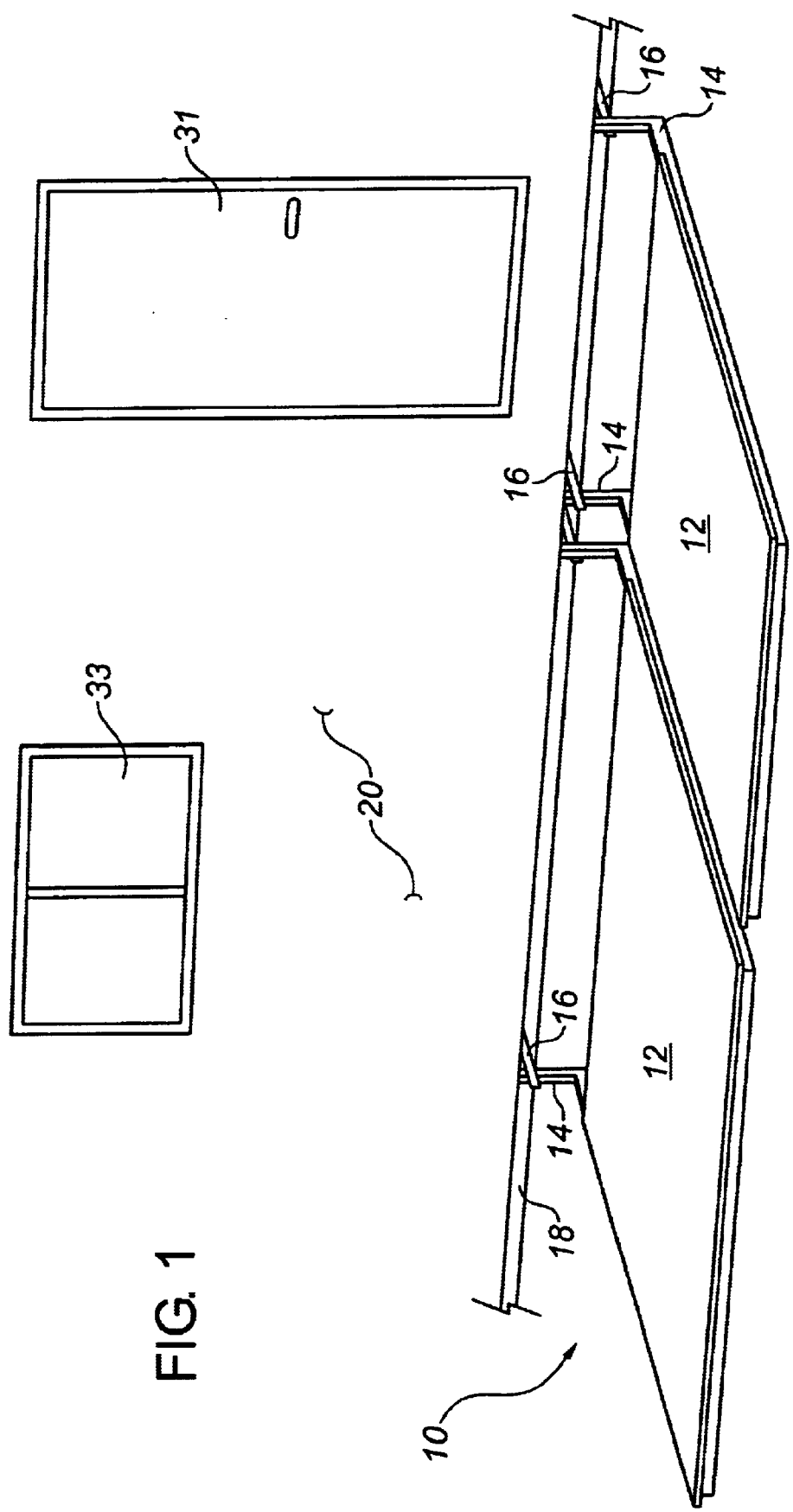
FIG. 1 is a perspective view of a recreational vehicle foldable deck with multiple segments shown in an operative position constructed in accordance with the teachings of the present invention.

The preferred embodiment, a recreational vehicle foldable deck generally identified by reference numeral 10, will now be described with reference to FIGS. 1 through 6.

Figure 2:
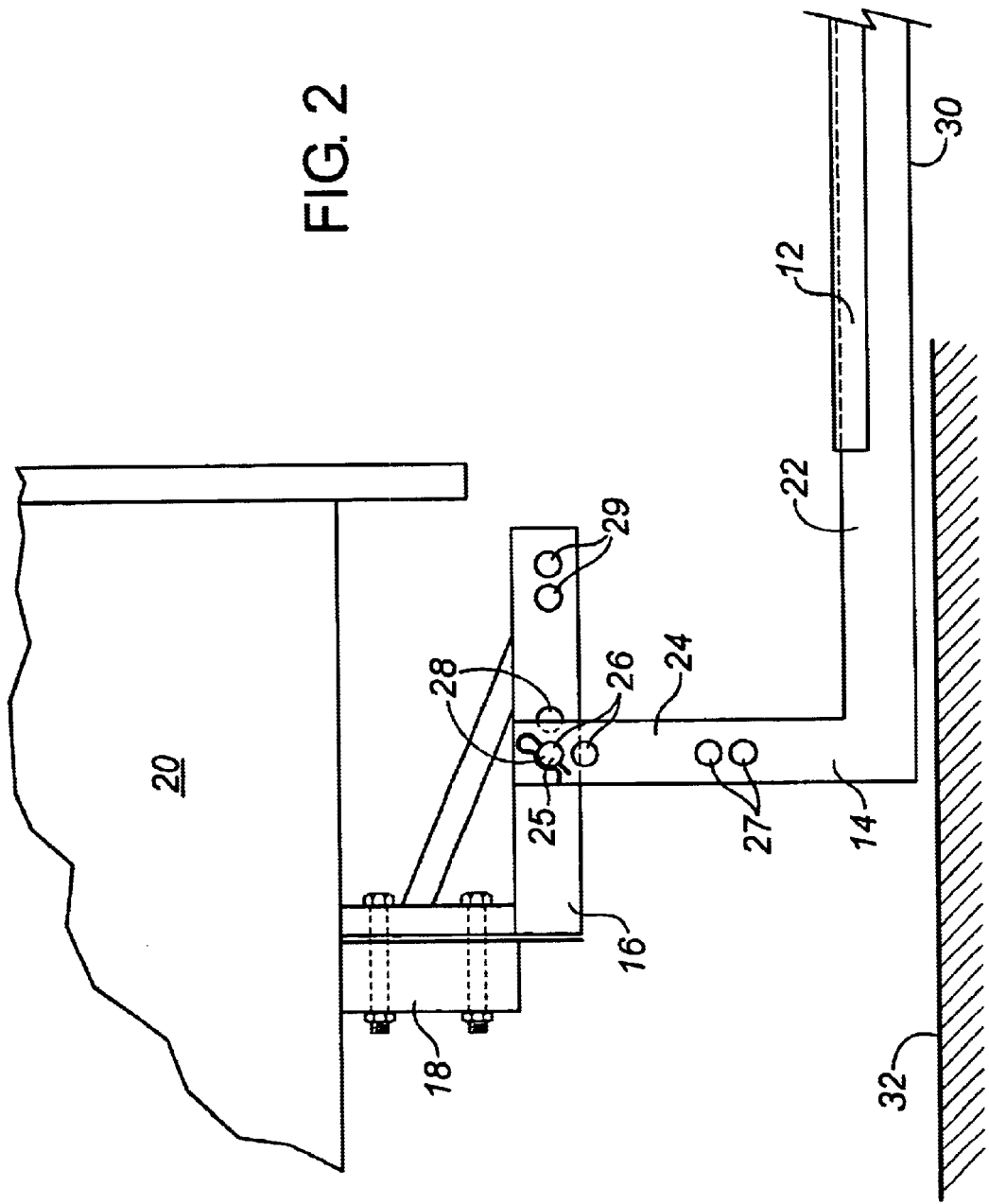
FIG. 2 is a side elevation view of the recreational vehicle foldable deck illustrated in FIG. 1 in an operative position.
Figure 3:
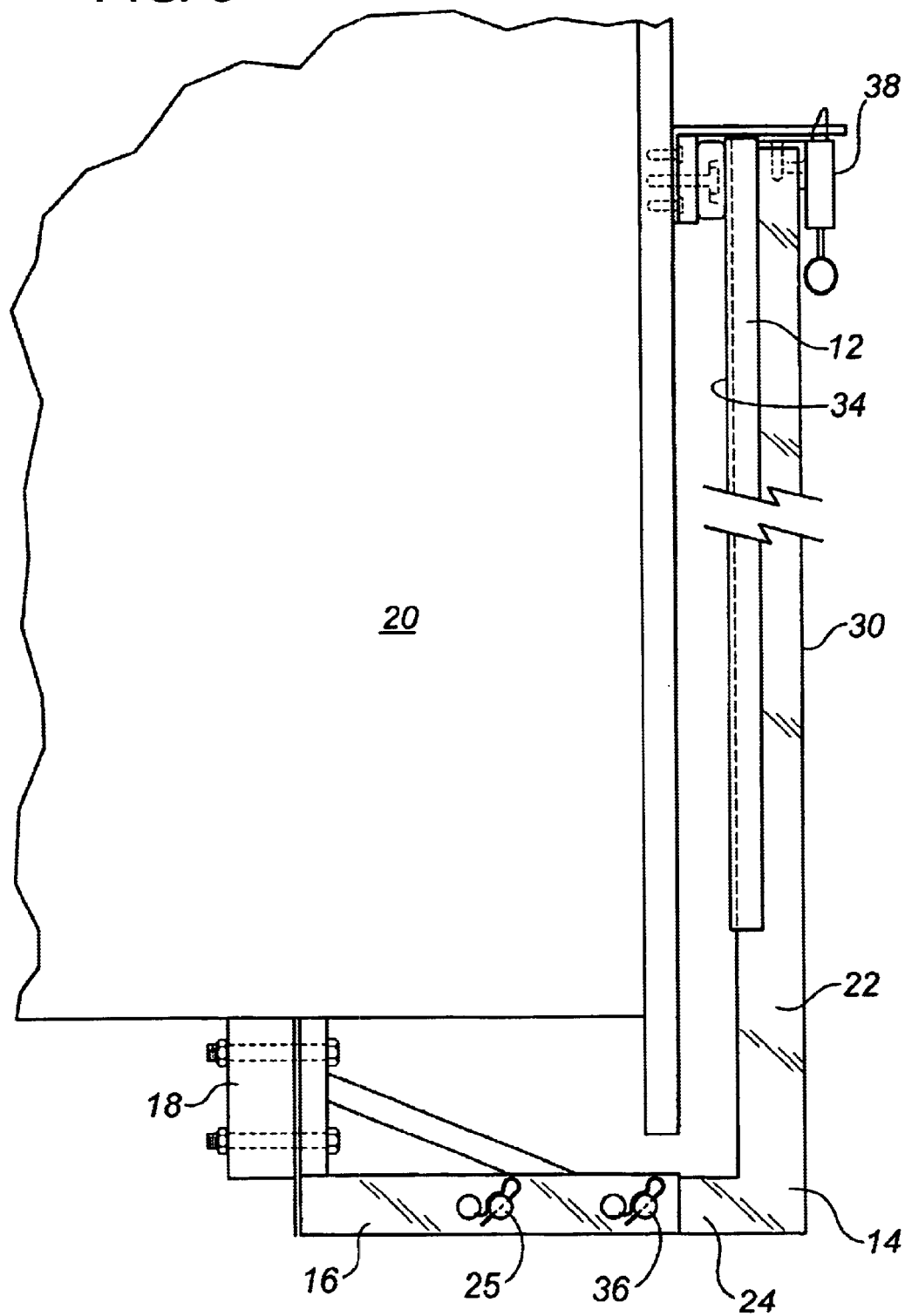
FIG. 3 is a side elevation view of the recreational vehicle foldable deck illustrated in FIG. 1 in a stored position.
Figure 6:
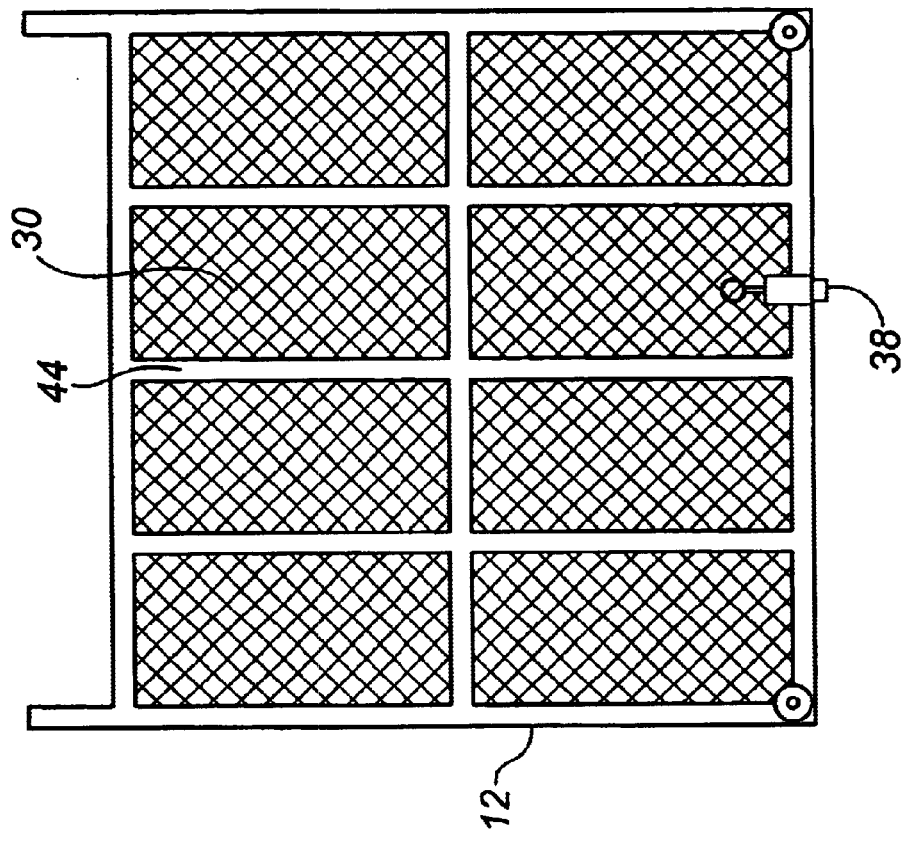
FIG. 6 is a bottom elevation view of one of the segments of the recreational vehicle foldable deck illustrated in FIG. 1.
Figure 5:
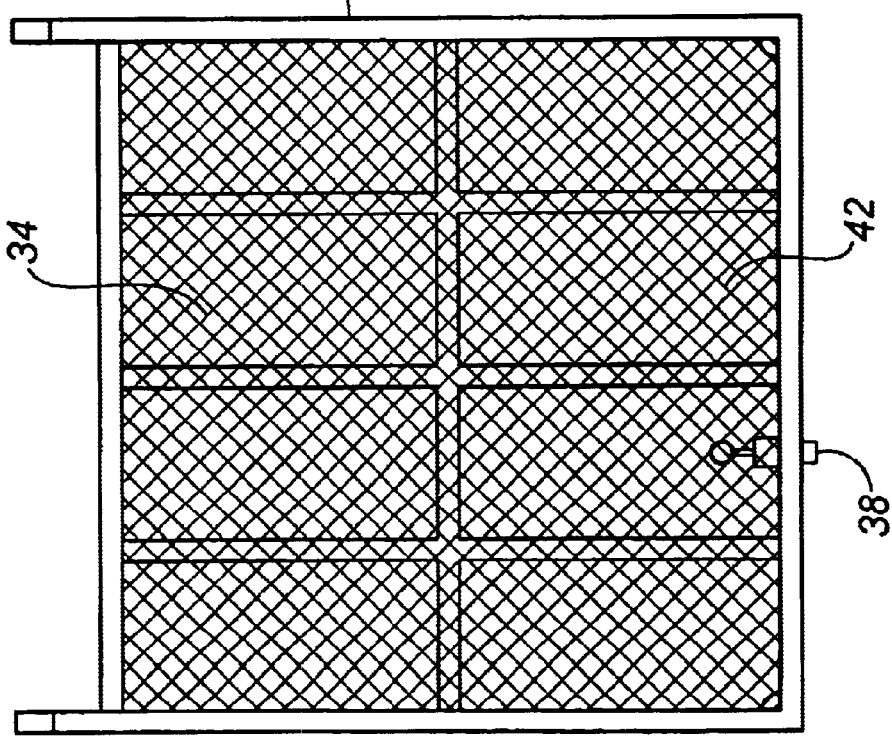
FIG. 5 is a top elevation view of one of the segments of the recreational vehicle foldable deck illustrated in FIG. 1.

Structure and Relationship of Parts:

Referring to FIG. 1, foldable deck 10 has a platform which is segmented into a two or more segments 12. Segmented platform 12 is attached to "L" shaped members 14 which are pivotally attached to supports 16. Supports 16 are, in turn, fixedly attached to frame 18 of one side of recreational vehicle 20. Each one of segmented platforms 12 is pivotally movable between a substantially horizontal operative position illustrated in FIG. 2 and a substantially vertical stored position illustrated in FIG. 3. Referring to FIG. 2, "L" shaped member 14 has a first end 22 and a second end 24. First end 22 is fixedly attached to segmented platform 12. Second end 24 is adapted with a plurality of attachment points 26. Support 16 is similarly adapted with a second plurality of attachment points 28. Each of "L" shaped members 14 is pivotally secured to supports 16 by pivot pins 25 extending through a selected one of apertures 28 in supports 16 and a selected one of apertures 26 in "L" shaped members 14. The selection of the respective apertures 28 and 26 in supports 16 and "L" shaped members, respectively, permits adjustment to maintain platform segment 12 close to the ground surface when in the operative position as illustrated in FIG. 2 and close to the one side of the recreational vehicle 20 when in the stored position, as illustrated in FIG. 3. Referring to FIG. 2, second end 24 is shown at a substantially right angle to support 16 when segmented platform 12 is in the substantially horizontal operative position with an underside 30 of segmented platform 12 oriented downwards toward ground surface 32. Referring to FIG. 3, second end 24 is shown substantially parallel with support 16 when segmented platform 12 is in a substantially vertical stored position with a top 34 of segmented platform 12 oriented towards one side of recreational vehicle 20. A spring loaded latch mechanism 38 positioned along a peripheral edge of segmented platform 12 serves to secure segmented platform 12 in the substantially vertical stored position. When recreational vehicle 20 is going to be travelling on a highway, a locking pin 36 can be inserted apertures in "L" shaped member 14 and support 16 to further secure segmented platform 12 in a substantially vertical stored position. The apertures which receive locking pin 36 are best illustrated in FIG. 2, those apertures being apertures 27 on "L" shaped member 14 and apertures 29 on supports 16. Referring to FIG. 4, "L" shaped member 14 may optionally be equipped with a tension spring 40, which acts against support 16. Referring to FIG. 5, it is preferred that top 34 of segmented platform 12 be covered with a metal lattice work of see-through mesh 42. Referring to FIG. 6, underside 30 of segmented platform 12 has framework 44 and spring-loaded latch assembly 38.

Operation:

The use and operation of recreational vehicle foldable deck 10 will now be described with reference to FIGS. 1 through 6 Referring to FIG. 1, recreational vehicle foldable deck 10 may be lowered to a substantially horizontal operative position as shown wherein each segment of segmented platform 12 is oriented substantially below the level of frame 18. Referring to FIGS. 2 and 3, users, by selectively adjusting the pivotal attachment via plurality of attachment points 26 or second plurality of attachment points 28, may orient underside 30 and framework 44 of segmented deck 12 to a substantially close position relative to ground surface 32. Further, users may lift any segment of the segmented platform 12 and place each segmented platform 12 in a substantially vertical storage position. Referring to FIG. 4, the raising of segmented platform may, optionally, be assisted by tensioning spring 40. Referring to FIG. 3, when in the substantially vertical stored position, foldable deck 10 is secured in position with spring loaded latch assembly 38. Prior to highway travel, locking pin 36 may be placed in position as an additional safety precaution.

It will be apparent to one skilled in the art from a review of FIG. 1, the advantage that the described segmented platform provides. Having the segments independently movable between the operative position and the stored position enables access to be obtained to a door 31 on recreational vehicle 20 by lowering only one of the platform segments 12 to the operative position. Having the platform segmented reduces the size and weight of each of the individual segments, enabling them be manually pivoted and lifted from the operative position to the stored position. By having each segment consisting of a framework covered by a see-through mesh covering, persons are able to see through windows 33 on recreational vehicle 20 and air can pass through each of platform segments 12 to utility vents and the like when the platform segments 20 are in the stored position.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A recreational vehicle foldable deck, comprising:
   at least two supports adapted for attachment to a structural frame along one side of a recreational vehicle;
   a platform having a top and an underside;
   at least two "L" shaped members, each having a first end and a second end;
   the first end of each of the at least two "L" shaped members being fixedly secured in spaced relation to the platform; and
   the second end of each of the at least two "L" shaped members being pivotally secured to one of the at least two supports, such that the platform is pivotally movable from a substantially vertical stored position parallel to the one side of the recreational vehicle to a substantially horizontal operative position resting at a ground surface.

2. The recreational vehicle foldable deck as defined in claim 1, wherein one of the at least two supports or the at least two "L" shaped members have several attachment points, thereby permitting adjustment to maintain the platform close to the ground surface when in the operative position and close to the one side of the recreational vehicle when in the stored position.

3. The recreational vehicle foldable deck as defined in claim 1, wherein the platform is a framework covered by a see-through mesh covering, such that persons are able to see through windows on the recreational vehicle and air can pass through the platform to utility vents when the platform is in the stored position.

4. The recreation vehicle foldable deck as defined in claim 1, wherein the platform is segmented into at least two segments, the segments being independently movable between the operative position and the stored position, such that access may be obtained to a door on the recreational vehicle by lowering only one of the at least two segments to the operative position.

5. The recreational vehicle foldable deck as defined in claim 4, wherein there are several segments, the size and weight of the segments being selected to enable the segments to be pivoted and manually lifted from the operative position to the stored position.

6. The recreational vehicle foldable deck as defined in claim 4, wherein the segments have tension springs, biasing the segments into the stored position, thereby reducing the amount of force required to manually lift the segments from the operative position to the stored position.

7. The recreational vehicle foldable deck as defined in claim 1, wherein at least one spring-loaded latch is provided to latch the platform in the stored position.

8. The recreational vehicle foldable deck as defined in claim 1, wherein at least one locking pin extends through at least one of the supports and at least one of the "L" shaped members to lock the platform in the stored position.

9. A recreational vehicle foldable deck, comprising:

supports adapted for attachment to a structural frame along one side of a recreational vehicle, each of the supports having several apertures;

a platform having a top, an underside and segmented into at least two segments;

"L" shaped members, each having a first end, a second end and several apertures;

the first end of each of the "L" shaped members being fixedly secured in spaced relation to one of the segments of the platform, there being at least two "L" shaped members for each of the segments; and the second end of each of the "L" shaped members being pivotally secured to one of the supports, such that each segment of the platform is pivotally movable from a substantially vertical stored position parallel to the one side of the recreational vehicle to a substantially horizontal operative position resting at a ground surface, each of the "L" shaped members being pivotally secured to the supports by pivot pins extending through a selected one of the apertures in one of the supports and a selected one of the apertures in one of the "L" shaped members, the selection of the respective apertures in the supports and "L" shaped members thereby permitting adjustment to maintain the segment of the platform close to the ground surface when in the operative position and close to the one side of the recreational vehicle when in the stored position, the segments being independently movable between the operative position and the stored position, such that access may be obtained to a door on the recreational vehicle by lowering only one of the at least two segments to the operative position, each segment consisting of a framework covered by a see-through mesh covering, such that persons are able to see through windows on the recreational vehicle and air can pass through the segments to utility vents when the segments of the platform are in the stored position, the size and weight of the segments being selected to enable the segments to be pivoted and manually lifted from the operative position to the stored position, the segments having tension springs biasing the segments into the stored position, thereby reducing the amount of force required to manually lift the segments from the operative position to the stored position;

a spring loaded latch being provided to latch the platform in a stored position and provision being made to lock the platform in the stored position by extending a locking pin through one of the apertures in one of the supports and one of the apertures in one of the "L" shaped members.

* * * * *